US009510283B2

(12) United States Patent
Solum

(10) Patent No.: US 9,510,283 B2
(45) Date of Patent: Nov. 29, 2016

(54) SYSTEMS AND METHODS FOR MANAGING POWER CONSUMPTION IN A WIRELESS NETWORK

(71) Applicant: Starkey Laboratories, Inc., Eden Prairie, MN (US)

(72) Inventor: Jeffrey Paul Solum, Shorewood, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 87 days.

(21) Appl. No.: 14/321,346

(22) Filed: Jul. 1, 2014

(65) Prior Publication Data

US 2015/0215865 A1    Jul. 30, 2015

Related U.S. Application Data

(60) Provisional application No. 61/931,294, filed on Jan. 24, 2014.

(51) Int. Cl.
*H04W 52/02* (2009.01)
*H04B 1/08* (2006.01)
*H04R 25/00* (2006.01)

(52) U.S. Cl.
CPC ......... *H04W 52/0216* (2013.01); *H04B 1/086* (2013.01); *H04R 25/00* (2013.01); *H04W 52/0232* (2013.01); *H04W 52/0248* (2013.01); *H04W 52/0277* (2013.01)

(58) Field of Classification Search
CPC . H04B 1/086; H04R 25/00; H04W 52/0216; H04W 52/0232; H04W 52/0248; H04W 52/0277

USPC .......................................................... 370/311
See application file for complete search history.

(56) References Cited

U.S. PATENT DOCUMENTS 5,885,906 A    3/1999  Reynolds et al.
7,636,298 B2*  12/2009  Miura ................... H04L 1/1819
                                                       370/216

(Continued)

FOREIGN PATENT DOCUMENTS

WO    WO-2011131241 A1    10/2011

OTHER PUBLICATIONS

"European Application Serial No. 15152244.8, Extended European Search Report mailed Jun. 23, 2015", 7 pgs.

(Continued)

*Primary Examiner* — Mohammad Anwar
*Assistant Examiner* — Kokou R Detse
(74) *Attorney, Agent, or Firm* — Schwegman Lundberg & Woessner, P.A.

(57) ABSTRACT

Disclosed herein, among other things, are systems and methods for managing power consumption in a wireless network. One aspect of the present subject matter includes a method for wireless communications of isochronous data. A transmission of isochronous data is received using an electronic device having a battery. The method determines how many redundant transmissions can be received by the device within a predetermined time frame while limiting discharge of the battery, and adjusts reception of the redundant transmissions based on the determination. In various embodiments, a reduction in received redundant transmissions preserves energy and prevents complete discharge of the battery.

19 Claims, 3 Drawing Sheets

(56) References Cited

U.S. PATENT DOCUMENTS

| | | | |
|---|---|---|---|
| 8,175,023 B2* | 5/2012 | Hikari | H04L 47/10 370/312 |
| 8,195,936 B2* | 6/2012 | Won | H04L 9/3234 713/155 |
| 9,065,749 B2* | 6/2015 | Cohen | H04L 45/125 |
| 9,131,452 B2* | 9/2015 | Bartels | H04W 52/223 |
| 2004/0009728 A1 | 1/2004 | Kubomura et al. | |
| 2004/0113863 A1 | 6/2004 | Stonier | |
| 2005/0089043 A1* | 4/2005 | Seckin | H04L 41/5006 370/395.21 |
| 2008/0049746 A1* | 2/2008 | Morrill | H04L 12/6418 370/389 |
| 2010/0054512 A1* | 3/2010 | Solum | H04R 25/554 381/315 |
| 2010/0202642 A1* | 8/2010 | LoPresti | A61B 5/125 381/321 |
| 2012/0093324 A1 | 4/2012 | Sinasi | |
| 2012/0310395 A1 | 12/2012 | El-hoiydi | |
| 2013/0173946 A1* | 7/2013 | Rotem | G06F 1/3206 713/340 |

OTHER PUBLICATIONS

"European Application Serial No. 15152244.8, Office Action mailed Aug. 3, 2015", 2 pgs.

"European Application Serial No. 15152244.8, Response filed Jan. 29, 2016 to Extended European Search Report mailed Jun. 23, 2015", 12 pgs.

* cited by examiner

SYSTEMS AND METHODS FOR MANAGING POWER CONSUMPTION IN A WIRELESS NETWORK

CLAIM OF PRIORITY AND INCORPORATION BY REFERENCE

The present application claims the benefit under 35 U.S.C. §119(e) of U.S. Provisional Patent Application 61/931,294, filed Jan. 24, 2014, the disclosure of which is hereby incorporated by reference herein in its entirety.

TECHNICAL FIELD

This document relates generally to wireless communication and more particularly to systems and methods for managing power consumption in a wireless network.

BACKGROUND

Mobile communication devices include a battery to provide power for internal wireless communication electronics, such as processors, transceivers and antennae. Typical mobile device batteries, such as zinc air batteries, have limited capacity both for peak and average current consumption. Various battery chemistries can be starved of energy during peak consumption periods, but can recover during rest periods.

Accordingly, there is a need in the art for improved systems and methods to prevent batteries from overuse during wireless communication.

SUMMARY

Disclosed herein, among other things, are systems and methods for managing power consumption in a wireless network. One aspect of the present subject matter includes a method for wireless communications of isochronous data. A transmission of isochronous data is received using an electronic device having a battery. The method determines how many redundant transmissions can be received by the device within a predetermined time frame while limiting discharge of the battery, and adjusts reception of the redundant transmissions based on the determination. In various embodiments, a reduction in received redundant transmissions preserves energy and prevents complete discharge of the battery.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

Figure 1:
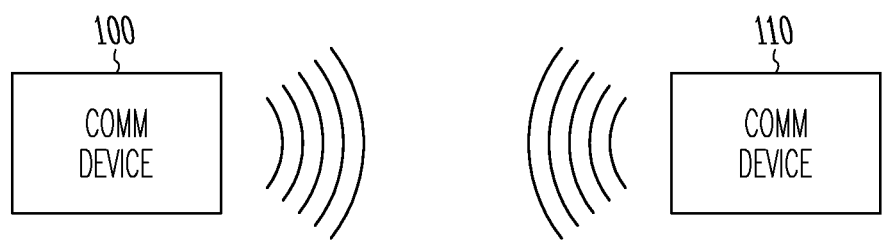
FIG. 1 illustrates an interface between two communication devices, according to various embodiments of the present subject matter.

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

Modern portable wireless communication equipment employs radio communications for various uses, some of which include the transmission of isochronous data such as audio and video data. Such communication utilizes highly reliable data networks capable of low packet and bit error rates. These forms of digital information use low latency delivery to ensure timely rendering of the information. To ensure high quality delivery of wireless data, a wireless host device employs techniques such as retransmissions based on an acknowledgement scheme, or relies on unconditional retransmissions for the purpose of lowering packet error rate. The wireless host can be the source of the audio or video information. Other forms of isochronous information such as time sensitive data can also employ such techniques.

Portable electronic devices such as headsets, hearing aids, head worn displays and the like employ small batteries with limited capacity. Some hearing assistance devices use very limited capacity batteries. Hearing aids in particular are extremely small and may be worn on the ear, behind the ear or in some cases in the ear.

The present detailed description will discuss hearing assistance devices using the example of hearing aids. Hearing aids are only one type of hearing assistance device. Other hearing assistance devices include, but are not limited to, those in this document. It is understood that their use in the description is intended to demonstrate the present subject matter, but not in a limited or exclusive or exhaustive sense.

In various embodiments, portable electronics devices (such as hearing aids) employ both rechargeable and non-rechargeable battery types. Chemical batteries have limited capacity for both peak and average current consumption. Zinc air batteries in particular rely on oxygen removed from surrounding air to supply the chemical reaction that generates electricity used to power devices such as hearing aids. When peak current is drawn from this type of battery, the battery can become starved of oxygen which lowers the output voltage of the cell. The battery will recover if the peak current load is temporarily removed. This is the case when using wireless radios for packet type communication such as Bluetooth or WiFi, as an example. When the data rate over the air data is higher than the baseband consumption of data, the radio can be duty cycled. During "on" times of the radio, large amounts of data can be transferred over the air from a source device to a sync device. During "off" times, the radio can go into a very low power state, while the data that was transferred can be consumed by the baseband process. It is during these periods of rest that the battery voltage can be restored. During the high current state, such as when the radio is "on" to receive or transmit a packet, the chemical battery can be temporarily depleted. In the case of a zinc air battery, during this time the battery becomes starved of oxygen.

A wireless system can improve its effective packet error rate by resending the packets based on non-acknowledgments from the sink devices or by unconditionally resending of packets. These redundant packets can be sent on different frequencies and or at different times for the purpose of mitigating the adverse effects of interference or multipath fading propagation. Peripheral sink devices with sufficient battery capacity may be able to receive all redundant packets as needed, thus achieving a much higher packet reliability. According to various embodiments, devices with limited battery capacity can forego listening to all necessary redundant packets, thus experiencing a slightly higher packet error rate when compared with sink devices having higher battery capacities. Devices such as these may have the capacity to receive some but not all of the necessary redundant packets being sent from the source device.

Sink devices will normally receive a packet on the first try from a host, however assuming a raw packet error rate 10%, the sink device will only have to listen to 10% of the retransmissions of the source device. This can work for both limited capacity batteries and higher capacity batteries in certain circumstances. But if the packet error rate increases to 50%, batteries with limited capacity may fail if they try and listen to 50% more redundant packets. In various embodiments, the sink devices then have to trade off energy consumption with quality of reception. The present subject matter uses this tradeoff between energy consumption and reception quality.

Disclosed herein, among other things, are systems and methods for managing power consumption in a wireless network. One aspect of the present subject matter includes a method for wireless communications of isochronous data. A transmission of isochronous data is received using an electronic device having a battery. The method determines how many redundant transmissions can be received by the device within a predetermined time frame while limiting discharge of the battery, and adjusts reception of the redundant transmissions based on the determination. Thus, the present subject matter allows a wireless device consuming isochronous data to trade off quality of reception with power consumption.

In various embodiments, the present subject matter employs a sliding window in time to determine how many retransmissions can be received within a time frame while preventing a battery from being overused to the point of failure. Thus, the present system and method allows for a gradual degradation in quality of service based on the energy being consumed from a power source such as a battery.

According to various embodiments, a communication device which monitors its energy capacity can limit its ability to listen to redundant packets. In one embodiment, the device limits the overall percentage of redundant packets received to 10% over a sliding window of time (e.g. 100 ms, in an embodiment) to prevent the energy starvation of the battery and allow time for the battery to recover. In various embodiments, the window can be adjusted both in percentage of allowable retransmission receptions and time interval depending on the capacity and chemistry of the battery. In various embodiments, these variables are adjustable and programmable. In various embodiments, the variables are set based on device type and/or battery type.

Various embodiments provide a method that trades off power consumption with improved effective packet error rate (PER). In one embodiment, this trade off includes allowing a receiver to be given a number of tokens to use redundant receptions each time a primary reception is successful. These tokens are used by the receiver when redundant packets are needed for successful reception. For example, a battery with limited capacity can receive a single token on the successful reception of a packet at the first time slot on which a new isochronous data packet is available. If on the next data frame the first time slot was not successfully received, the receiver can use the token to receive a redundant packet. However, if the receiver does not receive a packet on the next first time slot, it will not be able to wake up and receive the packet on a second time slot, since no tokens remain. Other embodiments in which the receiver is allowed to miss redundant packets for the purpose of trading off data integrity for power consumption are possible without departing from the scope of the present subject matter.

Figure 3:
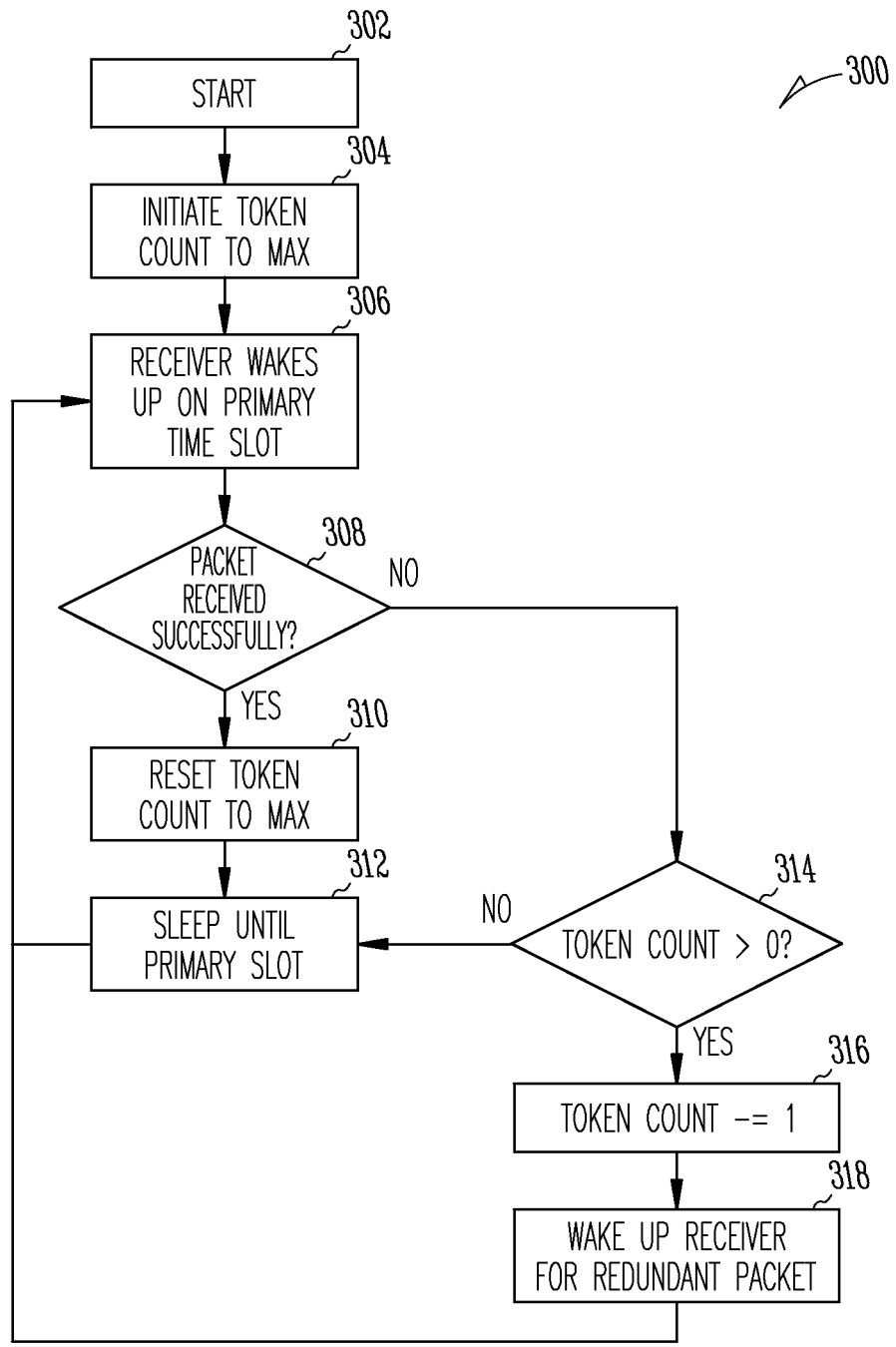
FIG. 3 illustrates a flow diagram of a method for managing power consumption in a wireless network, according to various embodiments of the present subject matter.

FIG. 3 illustrates a flow diagram of a method 300 for managing power consumption in a wireless network, according to various embodiments of the present subject matter. The method starts at 302 and initiates a token count to a programmable maximum number at 304. At 306, the receiver wakes up on a primary time slot. If a packet is successfully received at 308, the token count is reset to the maximum number at 310 and the receiver sleeps until the primary slot at 312 when it wakes up at 306. If the packet is not successful received at 308, the token count is checked to see if greater than zero at 314, and if not the receiver sleeps until the primary slot at 312. If the token count is greater than zero at 314, the token count is decremented at 316 and the receiver wakes up for a redundant packet at 318, before returning to step 306.

In various embodiments using a hearing assistance device, battery voltage level (Vbat) in the device can be used as part of the decision criteria for determining when to reduce redundant packet reception. In further embodiments, Coulomb counting can be used as part of the decision criteria for determining when to reduce redundant packet reception. In various embodiments, both Vbat level and Coulomb counting can be used. Other battery characteristics that can be used for this purpose include, but are not limited to, battery run time and discharge rate. These battery characteristics provide a packet reduction strategy that is independent of battery size.

In one embodiment, streaming of wireless communications can be disabled if the PER exceeds a threshold over a sliding time window. Besides managing power, benefits include mitigating interference when multiple users are co-located. This effectively increases the number of users that can use the wireless system for hearing assistance devices. Various embodiments of the present subject matter provide feedback to the user to discontinue wireless use if the wireless link is being stressed beyond its designed limit, such as when a cell phone is placed in a pants pocket. In various embodiments, consecutive missed packets can be used as a metric to throttle performance. In further embodiments, peak current can be used, such that higher peak current drains are possible if the battery permitted a recovery time window, thus minimizing the need for larger bypass capacitors.

The present subject matter provides for a communication device that can trade off power consumption with quality of service. In one embodiment, the present subject matter produces high quality wireless digital audio at the output of a hearing aid while lowering the power consumption of a battery used in a hearing aid.

FIG. 1 illustrates an interface between two communication devices, according to various embodiments of the present subject matter. In various embodiments, the depicted wireless interface between a first communication device 100 and a second communication device 110 includes radio frequency communications. Other wireless communication types can be used without departing from the scope of the present disclosure. In various embodiments, the communication devices use multiple wireless communication types and protocols. In one embodiment, the first and second communication devices are of the same type. In another embodiment, the communication devices are of different types. In various embodiments, at least one of the communication devices includes a hearing assistance device, such as a hearing aid. In one embodiment, the first communication device 100 includes a host device such as an audio or video streaming device, and the second communication device 110 includes a hearing assistance device. More than two communication devices can be used without departing from the scope of the present disclosure.

Figure 2:
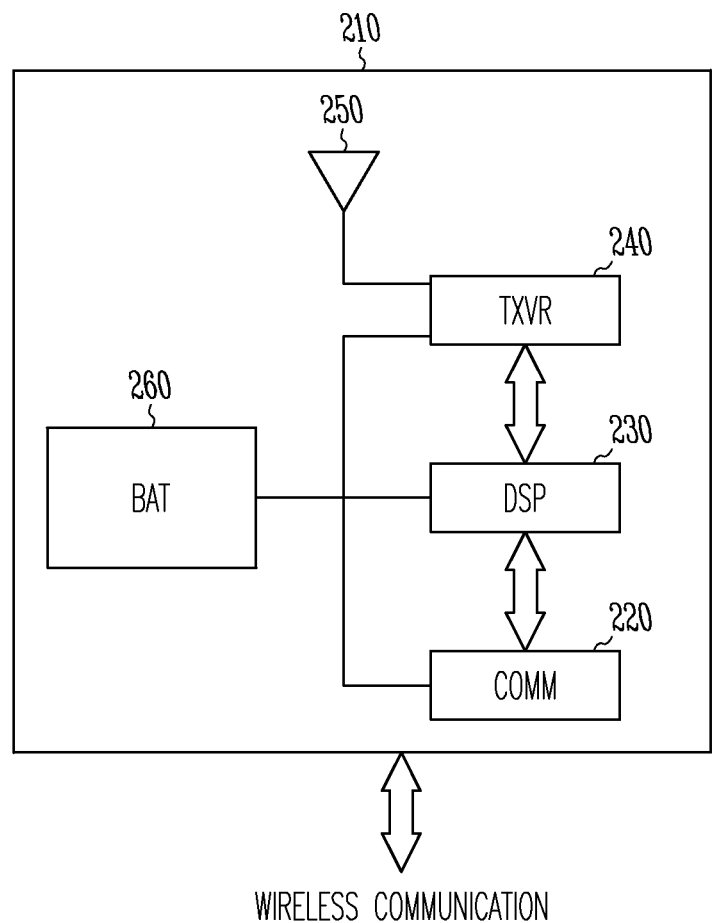
FIG. 2 illustrates an example of a communication device of FIG. 1, according to various embodiments of the present subject matter.

FIG. 2 illustrates an example of a communication device of FIG. 1, according to various embodiments of the present subject matter. In the depicted embodiment, communication device 210 receives a digital signal using communication port 220 from a source, such as a communication device 100. The signal is processed by a digital signal processor 230 and can be transmitted via transceiver 240 using antenna 250. In one embodiment, the digital signal is wireless. In one embodiment, the digital signal is wired. The digital signal may be transceived bidirectionally, transmitted unidirectionally or received unidirectionally by communication port 220. In various embodiments, the processor 230 is configured to execute instructions to determine how many retransmissions can be received within a time frame while preventing a device battery 260 from being overused to the point of failure.

The drawing shows an antenna 250 which is shared for transmit and receive in one embodiment. Various embodiments may incorporate separate receive and transmit sections and antennas without departing from the scope of the present subject matter. Furthermore, the antennas can be located on a substrate of the device 210 in various embodiments. In other embodiments, the antenna may be external to the device 210. Various types of antennas, including omnidirectional and directional antennas may be used. Various types of batteries 260 can be used to power the electronics of the device, in various embodiments.

Various embodiments of the present subject matter support wireless communications with a hearing assistance device. In various embodiments the wireless communications can include standard or nonstandard communications. Some examples of standard wireless communications include link protocols including, but not limited to, Bluetooth™, IEEE 802.11(wireless LANs), 802.15 (WPANs), 802.16 (WiMAX), cellular protocols including, but not limited to CDMA and GSM, ZigBee, and ultra-wideband (UWB) technologies. Such protocols support radio frequency communications and some support infrared communications. Although the present system is demonstrated as a radio system, it is possible that other forms of wireless communications can be used such as ultrasonic, optical, and others. It is understood that the standards which can be used include past and present standards. It is also contemplated that future versions of these standards and new future standards may be employed without departing from the scope of the present subject matter.

The wireless communications support a connection from other devices. Such connections include, but are not limited to, one or more mono or stereo connections or digital connections having link protocols including, but not limited to 802.3 (Ethernet), 802.4, 802.5, USB, ATM, Fibre-channel, Firewire or 1394, InfiniBand, or a native streaming interface. In various embodiments, such connections include all past and present link protocols. It is also contemplated that future versions of these protocols and new future standards may be employed without departing from the scope of the present subject matter.

It is understood that variations in combinations of components may be employed without departing from the scope of the present subject matter. Hearing assistance devices typically include an enclosure or housing, a microphone, hearing assistance device electronics including processing electronics, and a speaker or receiver. It is understood that in various embodiments the microphone is optional. It is understood that in various embodiments the receiver is optional. Antenna configurations may vary and may be included within an enclosure for the electronics or be external to an enclosure for the electronics. Thus, the examples set forth herein are intended to be demonstrative and not a limiting or exhaustive depiction of variations.

It is further understood that any hearing assistance device may be used without departing from the scope and the devices depicted in the figures are intended to demonstrate the subject matter, but not in a limited, exhaustive, or exclusive sense. It is also understood that the present subject matter can be used with a device designed for use in the right ear or the left ear or both ears of the user.

It is understood that the hearing aids referenced in this patent application include a processor. The processor may be a digital signal processor (DSP), microprocessor, microcontroller, other digital logic, or combinations thereof. The processing of signals referenced in this application can be performed using the processor. Processing may be done in the digital domain, the analog domain, or combinations thereof. Processing may be done using subband processing techniques. Processing may be done with frequency domain or time domain approaches. Some processing may involve both frequency and time domain aspects. For brevity, in some examples drawings may omit certain blocks that perform frequency synthesis, frequency analysis, analog-to-digital conversion, digital-to-analog conversion, amplification, audio decoding, and certain types of filtering and processing. In various embodiments the processor is adapted to perform instructions stored in memory which may or may not be explicitly shown. Various types of memory may be used, including volatile and nonvolatile forms of memory. In various embodiments, instructions are performed by the processor to perform a number of signal processing tasks. In such embodiments, analog components are in communication with the processor to perform signal tasks, such as microphone reception, or receiver sound embodiments (i.e., in applications where such transducers are used). In various embodiments, different realizations of the block diagrams, circuits, and processes set forth herein may occur without departing from the scope of the present subject matter.

The present subject matter is demonstrated for hearing assistance devices, including hearing aids, including but not limited to, behind-the-ear (BTE), in-the-ear (ITE), in-the-canal (ITC), receiver-in-canal (RIC), invisible-in-canal (IIC) or completely-in-the-canal (CIC) type hearing aids. It is understood that behind-the-ear type hearing aids may include devices that reside substantially behind the ear or over the ear. Such devices may include hearing aids with receivers associated with the electronics portion of the behind-the-ear device, or hearing aids of the type having receivers in the ear canal of the user, including but not limited to receiver-in-canal (RIC) or receiver-in-the-ear (RITE) designs. The present subject matter can also be used in hearing assistance devices generally, such as cochlear implant type hearing devices and such as deep insertion devices having a transducer, such as a receiver or microphone, whether custom fitted, standard, open fitted or occlusive fitted. It is understood that other hearing assistance devices not expressly stated herein may be used in conjunction with the present subject matter.

This application is intended to cover adaptations or variations of the present subject matter. It is to be understood that the above description is intended to be illustrative, and not restrictive. The scope of the present subject matter should be determined with reference to the appended claims, along with the full scope of legal equivalents to which such claims are entitled.

What is claimed is:

1. A method for wireless communications of isochronous data, comprising:
   receiving a transmission of isochronous data using an electronic device having a battery and a receiver;
   determining a data rate that can be accommodated by the electronic device using a number of redundant transmissions received by the device within a predetermined time frame to limit discharge of the battery, wherein the data rate and the time frame are adjustable and depends on the capacity and chemistry of the battery; and
   adjusting the receiver to the determined data rate.

2. The method of claim 1, wherein using an electronic device includes using a hearing aid.

3. The method of claim 1, wherein adjusting reception of the redundant transmissions includes decreasing an amount of time that a radio circuit of the electronic device is operational.

4. The method of claim 1, wherein the predetermined time frame is approximately 100 ms.

5. The method of claim 4, wherein adjusting reception of the redundant transmissions includes limiting an overall percentage of redundant packets received to 10% over the predetermined time frame.

6. The method of claim 1, wherein adjusting reception includes adjusting percentage of allowable retransmission receptions and adjusting the predetermined time interval depending on capacity and chemistry of the battery.

7. The method of claim 1, wherein determining how many redundant transmissions can be received by the device within a predetermined time frame includes using tokens to permit reception of redundant transmissions.

8. The method of claim 1, wherein determining how many redundant transmissions can be received by the device within a predetermined time frame includes using battery voltage level.

9. The method of claim 1, wherein determining how many redundant transmissions can be received by the device within a predetermined time frame includes using Coulomb counting.

10. The method of claim 1, wherein determining how many redundant transmissions can be received by the device within a predetermined time frame includes determining whether a packet error rate (PER) exceeds a threshold over the predetermined time frame.

11. The method of claim 1, wherein determining how many redundant transmissions can be received by the device within a predetermined time frame includes determining consecutive missed packets over the predetermined time frame.

12. A wireless communication device, comprising:
    a battery;
    a communication port configured to receive a wireless signal; and
    a processor connected to the battery and the communication port, the processor configured to execute instructions to determine a data rate that can be accommodated by the communication device using a number of redundant transmissions received by the device within a predetermined time frame to limit discharge of the battery; and adjust the communication port to the determined data rate, wherein the data rate and the time frame are adjustable and depends on the capacity and chemistry of the battery.

13. The device of claim 12, wherein the wireless communication device includes a hearing aid.

14. The device of claim 13, wherein the hearing aid includes an in-the-ear (ITE) hearing aid.

15. The device of claim 13, wherein the hearing aid includes a behind-the-ear (BTE) hearing aid.

16. The device of claim 13, wherein the hearing aid includes an in-the-canal (ITC) hearing aid.

17. The device of claim 13, wherein the hearing aid includes a receiver-in-canal (RIC) hearing aid.

18. The device of claim 13, wherein the hearing aid includes a completely-in-the-canal (CIC) hearing aid.

19. The device of claim 13, wherein the hearing aid includes a receiver-in-the-ear (RITE) hearing aid.

* * * * *